(12) United States Patent
Venkataraman et al.

(10) Patent No.: US 11,605,107 B2
(45) Date of Patent: *Mar. 14, 2023

(54) HANDLING SEARCH QUERIES

(71) Applicant: Google LLC, Mountain View, CA (US)

(72) Inventors: Shivakumar Venkataraman, Santa Clara, CA (US); Srdjan Petrovic, Palo Alto, CA (US); Arnar Mar Hrafnkelsson, Los Altos, CA (US); William S. Robinson, Menlo Park, CA (US); Alan Blount, Cambridge, MA (US); David L. Jones, Sunnyvale, CA (US); Tarun Kumar Jain, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 112 days.

This patent is subject to a terminal disclaimer.

(21) Appl. No.: 17/187,075

(22) Filed: Feb. 26, 2021

(65) Prior Publication Data
US 2021/0182901 A1 Jun. 17, 2021

Related U.S. Application Data

(63) Continuation of application No. 14/909,084, filed as application No. PCT/US2014/048659 on Jul. 29, 2014, now Pat. No. 10,963,909.

(30) Foreign Application Priority Data

Jul. 30, 2013 (EP) .................................... 13178592

(51) Int. Cl.
*G06Q 30/02* (2012.01)
*G06Q 30/0242* (2023.01)
(Continued)

(52) U.S. Cl.
CPC ............. *G06Q 30/0246* (2013.01); *G06F 16/24578* (2019.01); *G06F 16/9535* (2019.01);
(Continued)

(58) Field of Classification Search
CPC .......... G06Q 30/0246; G06Q 30/0244; G06Q 30/0256; G06Q 30/0275; G06F 16/24578; G06F 16/9535
See application file for complete search history.

(56) References Cited

U.S. PATENT DOCUMENTS 7,844,594 B1 * 11/2010 Holt ..................... G06F 16/345
707/706
7,873,621 B1 * 1/2011 Datar ..................... G06Q 30/02
707/706
(Continued)

FOREIGN PATENT DOCUMENTS

WO WO 2015017431 2/2015
WO WO 2015087145 6/2015

OTHER PUBLICATIONS

Hoelzle, The Google Gospel of Speed, Jan. 2012, https://www.thinkwithgoogle.com/future-of-marketing/digital-transformation/the-google-gospel-of-speed-urs-hoelzle/, pp. 1-7 (Year: 2012).*

(Continued)

*Primary Examiner* — John Van Bramer
(74) *Attorney, Agent, or Firm* — Fish & Richardson P.C.

(57) ABSTRACT

A system for providing advertisements with search results in response to a search query comprises a front end and an advertisement server. The front end is configured: to receive a search query; to send a first search request to a search server and sending a first advertisement request to an advertisement server, wherein the first search request includes the search query or information based on the search (Continued)

query, and wherein the first advertisement request includes the search query or information based on the search query and an indication that an advertisement response is not to be provided; to receive search results from the search server; and to send at least some of the search results to the advertisement server in a second advertisement request, wherein the second advertisement request includes an indication that an advertisement response is to be provided. The advertisement server is configured: in response to receiving the first advertisement request, to search for advertisements related to the search query to produce plural advertisement results each with an associated score; in response to receiving the second advertisement request, to modify the score of at least one of the plural advertisement results; to rank the plural advertisement results according to their scores; to select one or more of the highest ranked plural advertisement results; and to send an advertisement response to the front end, the advertisement response including the selected one or more highest ranked plural advertisement results. The front end is configured to provide the search results with the selected one or more highest ranked plural advertisement results.

20 Claims, 6 Drawing Sheets (51) Int. Cl.
*G06F 16/9535* (2019.01)
*G06F 16/2457* (2019.01)
*G06Q 30/0251* (2023.01)
*G06Q 30/0273* (2023.01)

(52) U.S. Cl.
CPC ..... *G06Q 30/0244* (2013.01); *G06Q 30/0256* (2013.01); *G06Q 30/0275* (2013.01)

(56) References Cited

U.S. PATENT DOCUMENTS

| | | | |
|---|---|---|---|
| 8,468,083 | B1 | 6/2013 | Szulczewski |
| 10,049,386 | B1* | 8/2018 | Venkataraman ... G06Q 30/0251 |
| 2008/0228926 | A1 | 9/2008 | Shiratzky et al. |
| 2008/0256224 | A1 | 10/2008 | Kaji et al. |
| 2009/0265467 | A1 | 10/2009 | Peles |
| 2009/0319517 | A1 | 12/2009 | Guha et al. |
| 2010/0057556 | A1 | 3/2010 | Rousso et al. |
| 2010/0145934 | A1* | 6/2010 | Tran ...................... G06F 16/951 707/E17.014 |
| 2011/0016005 | A1 | 1/2011 | Li et al. |
| 2011/0191315 | A1 | 8/2011 | Neumeyer et al. |
| 2011/0191338 | A1* | 8/2011 | Hylton ............... G06Q 30/0277 707/E17.014 |
| 2013/0110628 | A1 | 5/2013 | Yeo et al. |
| 2013/0151337 | A1 | 6/2013 | Flombaum et al. |

OTHER PUBLICATIONS

Anastasov. "European Office Action issued in European Application No. 13196433.0 (Goog-3264EP1)", dated Oct. 16, 2014, 3 pages.
Anastasov, "Extended European Search Report issued in European Application No. 13196433.0 (Goog-3264EP-1)", dated Feb. 13, 2014, 9 pages.
Anastasov, "International Search Report and Written Opinion issued in International Application No. PCT/IB2014/002723 (Goog-3264WP-1)", dated Feb. 4, 2015, 10 pages.
Chatel, "International Preliminary Report on Patentability issued in International Application No. PCT/US2014/002723 (Goog-3264WP-1)," dated Feb. 4, 2015, 10 pages.
Mohri, International Preliminary Report on Patentability issued in International Application No. PCT/US2014/048659 (Goog-3264WP1), dated Jun. 23, 2016, 8 pages.
William, "European Office Action issued in European Application No. 13178592.5 (Goog-3264EP)" dated Jun. 17, 2014, 3 pages.
William, "Extended European Search Report issued in European Application No. 13178592.5 (Goog-3264EP)", dated Dec. 17, 2013, 7 pages.
International Search Report and Written Opinion issued in corresponding International Application No. PCT/US2014/048659, filed Jul. 29, 2014, dated Nov. 6, 2014, 10 pages.
Office Action issued in European Application No. 14750418.7, dated Feb. 16, 2018, 5 pages.
Office Action issued in Chinese Application No. 201480053804.6, dated Nov. 1, 2018, 14 pages (with English translation).

* cited by examiner

HANDLING SEARCH QUERIES

CROSS-REFERENCE TO RELATED APPLICATIONS

This application is a continuation application of, and claims priority to, U.S. patent application Ser. No. 14/909,084, titled "Handling Search Queries," filed on Jan. 29, 2016, which application is a National Stage Application under 35 U.S.C. § 371 and claims the benefit of International Application No. PCT/US2014/048659, titled "Handling Search Queries," filed on Jul. 29, 2014, which application is the country equivalent to EP Patent Application No. 13178592.5 filed on Jul. 30, 2013. The disclosure of each of the foregoing applications are incorporated herein by reference.

FIELD OF THE INVENTION

This invention relates to handling search queries. In particular, it relates to providing advertisements with search results in response to a search query.

BACKGROUND TO THE INVENTION

Worldwideweb search services, such as those provided by Google, Inc. through google.com, have been used for a number of years and have been becoming increasingly sophisticated.

It is common when providing search results to a user to provide also one or more advertisements. Advertisements are paid for by advertisers, who are normally charged by the provider of the search services on the basis of a number of impressions (the number of times that an advertisement is presented to users) or on the basis of click-through (the number of occasions on which users click on a link in an advertisement, thereby directing traffic to the advertiser's website). A webpage provided in response to a search query thus typically has two components. The first is a number of search results, which are discreet listings that have been selected by a search engine used by the search services provider to identify webpages that are anticipated to be of interest to the user that submitted the search query. The second component of the webpage is one or more advertisements, which are selected by an advertisement server operated by the search services provider and which have been selected as likely being of interest to the user, based on the search query.

It would be desirable to take into account the search results provided by the search server when selecting advertisements for inclusion in the webpage. However, it has not heretofore been technically feasible to use the results provided by the search server in selecting advertisements without increasing the time between receiving a search query and providing the webpage of search results to an unacceptably long time. The present invention seeks to provide a solution to this problem.

SUMMARY OF THE INVENTION

A first aspect of the invention provides a system for providing advertisements with search results in response to a search query, the system comprising a front end and an advertisement server, wherein:
the front end is configured:
to receive a search query;
to send a first search request to a search server and sending a first advertisement request to an advertisement server, wherein the first search request includes the search query or information based on the search query, and wherein the first advertisement request includes the search query or information based on the search query and an indication that an advertisement response is not to be provided;
to receive search results from the search server; and
to send at least some of the search results to the advertisement server in a second advertisement request, wherein the second advertisement request includes an indication that an advertisement response is to be provided;
the advertisement server is configured:
in response to receiving the first advertisement request, to search for advertisements related to the search query to produce plural advertisement results each with an associated score;
in response to receiving the second advertisement request, to modify the score of at least one of the plural advertisement results;
to rank the plural advertisement results according to their scores;
to select one or more of the highest ranked plural advertisement results; and
to send an advertisement response to the front end, the advertisement response including the selected one or more highest ranked plural advertisement results; and
the front end is configured:
to provide the search results with the selected one or more highest ranked plural advertisement results.

The advertisement server may be configured to respond to receiving the second advertisement request by performing an additional search for advertisements using information forming part of the second advertisement request.

The advertisement server may be configured to modify the score of at least one of the plural advertisement results by modifying a predicted click-through rate of at least one of the plural advertisement results. Here, the advertisement server may be configured to modify the score of at least one of the plural advertisement results by modifying the predicted click-through rate of at least one of the plural advertisement results depending on user interface elements that are indicated in the second advertisement request.

The advertisement server may be configured to modify the score of at least one of the plural advertisement results by modifying a bid associated with of at least one of the plural advertisement results.

The advertisement server may be configured to modify the score of at least one of the plural advertisement results by modifying a relevance score associated with of at least one of the plural advertisement results. Here, the advertisement server may be configured to modify the score of at least one of the plural advertisement results by modifying the relevance score associated with of at least one of the plural advertisement results based on content of the top one of multiple search results identified in the second advertisement request. Alternatively or additionally, the advertisement server may be configured to modify the score of at least one of the plural advertisement results by modifying the relevance score associated with of at least one of the plural advertisement results based on a location of the top one of multiple search results identified in the second advertisement request.

The front end may be configured to open a first communication session with a load balancer, and wherein the load balancer is configured to open a second communication session with the advertisement server. Here, the front end and the load balancer may be configured to use a first session identifier in all messages sent within the first communication session after the first communication session has been established, and wherein the load balancer and the advertisement server are configured to use a second session identifier in all messages sent with the second communication session after the second communication session has been established.

The front end may be configured to process the search results received from the search server and, for the at least some of the search results, to include some but not all of the information comprising the search results in the second advertisement request.

The front end may be configured to include in the second advertisement request one or more of:
content type information;
map information indicating a map area;
information identifying the presence or absence of a knowledge card; and
information specific to the user.

The advertising server may be configured to modify visual appearance characteristics of one or more advertisements based on content of the second advertisement request.

A second aspect of the invention provides a method of providing advertisements with search results in response to a search query, the method comprising:
a front end:
receiving a search query;
sending a first search request to a search server and sending a first advertisement request to an advertisement server, wherein the first search request includes the search query or information based on the search query, and wherein the first advertisement request includes the search query or information based on the search query and an indication that an advertisement response is not to be provided;
receiving search results from the search server; and
sending at least some of the search results to the advertisement server in a second advertisement request, wherein the second advertisement request includes an indication that an advertisement response is to be provided;
the advertisement server:
in response to receiving the first advertisement request, searching for advertisements related to the search query to produce plural advertisement results each with an associated score;
in response to receiving the second advertisement request, modifying the score of at least one of the plural advertisement results;
ranking the plural advertisement results according to their scores;
selecting one or more of the highest ranked plural advertisement results; and
sending an advertisement response to the front end, the advertisement response including the selected one or more highest ranked plural advertisement results; and
the front end:
providing the search results with the selected one or more highest ranked plural advertisement results.

The invention also provides a computer program comprising machine readable instructions that when executed control a system comprising a front end and an advertisement server to perform this method.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Figure 1:
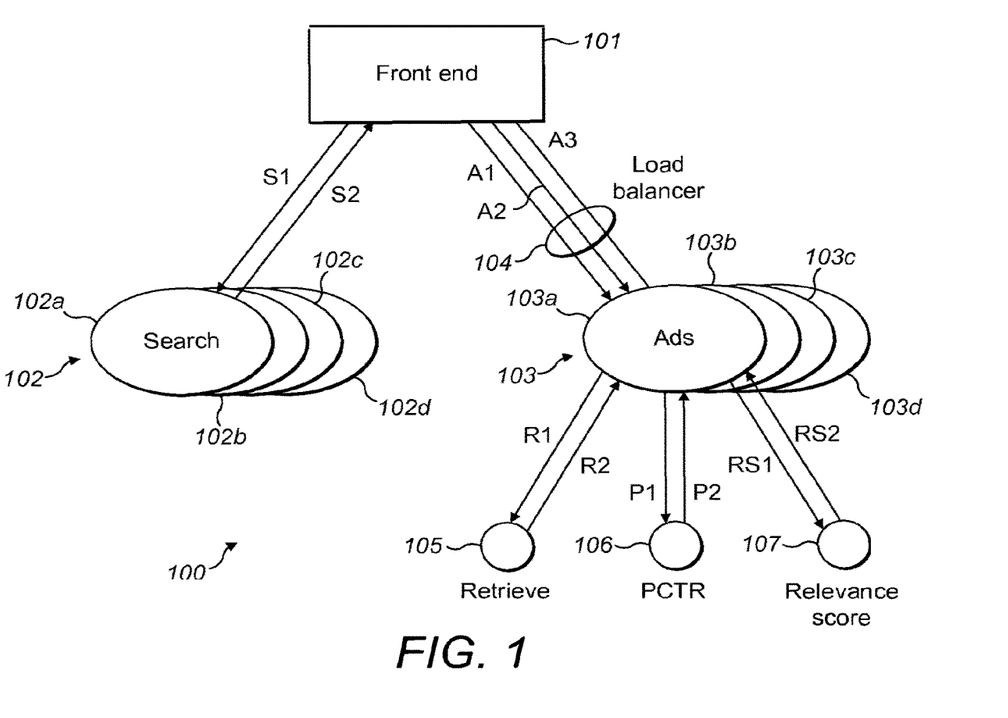
FIG. 1 is a schematic diagram illustrating a system operating according to aspects of the invention.

Referring firstly to FIG. 1, a system 100 operating according to aspects of the invention will now be described.

The system 100 includes three main components. These are a front end 101, a search server system 102 and an ads server system 103. The server system 102 is in bidirectional communication with the front end 101. The ads server system 103 is in bidirectional communication with the front end 101. In this example, there is no direct communication between the search server system 102 and the ads server system 103.

The search server system 102 comprises multiple servers. These are illustrated schematically in FIG. 1 as first to fourth servers 102a . . . 102d. However, it will be appreciated that this is merely schematic and that the search server system may comprise between one and many hundreds of physical servers.

Similarly, the ads server system 103 is shown in FIG. 1 as comprising four ads servers 103a . . . 103d. However, the ads server system 103 may comprise any number of physical servers between one and many hundreds of physical servers.

A load balancer 104 is connected between the front end 101 and the ads server system 103. Operation of the load balancer 104 is described in some detail below.

The ads server system 103 is bidirectionally connected to three subsystems. A first system is a retrieve subsystem 105. A second subsystem is a PCTR, or predicted click-through rate, subsystem 106. A third subsystem is a relevance score subsystem 107. Each of the servers 103a-103d of the ads server system 103 may include dedicated retrieve, PCTR and relevance score subsystems 105, 106, 107. Alternatively, multiple ones of the ads servers 103a to 103d may share common retrieve, PCTR and relevance score subsystems 105-107.

The front end 101 is a system comprising a server or multiple servers. The front end 101 is the system that is accessed when a user accesses a home webpage of a search service provider, for instance google.com. At least some of the servers of the front end 101 are web servers.

High level operation of the system of FIG. 1 will now be described with reference to FIG. 2.

Figure 2:
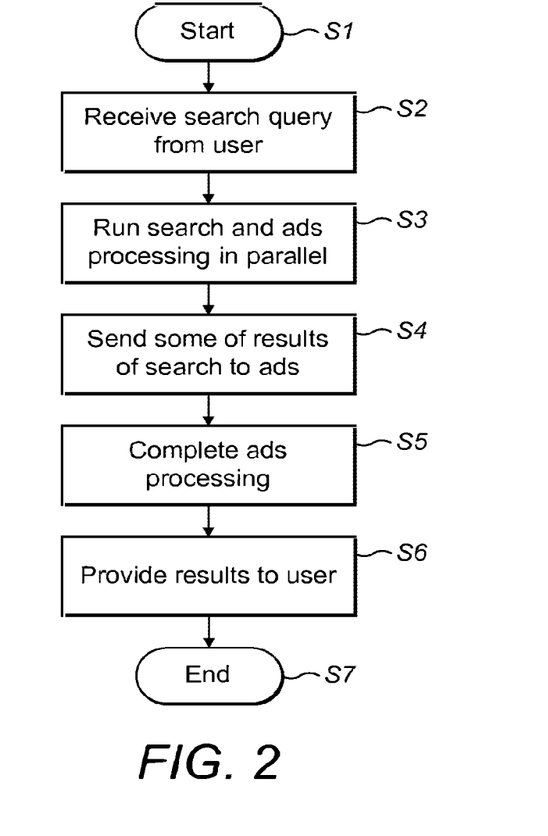
FIG. 2 is a flow chart illustrating high level operation of the system of FIG. 1 according to aspects of the invention.

The operation of FIG. 2 starts at step S1. At step S2, the front end 101 receives a search query from a user. Typically, step S2 involves receiving an http request from a browser application being used by the user, the http request including a search query that is presented into a search form provided by the browser application as a result of HTML code provided by the front end 101. Various alternative ways in which the front end 101 may be provided with a search query from a user will be apparent to the skilled person.

At step S3, the system runs search and ads (advertising) processing in parallel. This involves the search query being sent from the front end 101 to both the search server system 102 (as a search request) and the ads server system 103 (as a first advertisement request). The search request may be sent to the search server system 102 substantially simultaneously with the sending of the first advertisement request to the ads server system 103, or one may slightly follow the other. The first advertisement request sent to the ads server system 103 includes an instruction not to provide an advertisement response.

At step S4, some of the search results provided by the search server system 102 are provided by the front end 101 to the ads server system 103 as a second advertisement request. The aspects of the search results provided by the search server system to the front end 101 that are selected by the front end 101 for sending to the ads server system 103 in the second advertisement request may be made in any suitable way, and some examples are described later in this specification. The second advertising request sent as part of step S4 includes an indication that an advertisement response is to be provided.

At step S5, the ads server system 103 completes processing of the search query, using the original search query and using the part of the results of the search that were provided in step S4. The ads server system 103 then provides the resulting advertisement response to the front end 101. A webpage including the search results provided by the search service system 102 and the advertisements provided by the ads server system 103 is prepared by the front end and is provided to the user, who views the webpage using their browser application. This webpage can be called the search response.

The operation ends at step S7.

Very briefly, the process described with reference to FIG. 2 allows the advertisements provided in the search response webpage to the user to include advertisements that take into account the results of the processing of the search query by the search server system 102. Moreover, this is achieved relatively quickly. The relatively quick speed of provision is a result of the ads server 103 being able to partially process the search query in parallel with the search query being processed by the search server system 102. This is possible due to the contents of the advertisement requests, in particular the inclusion in the first advertisement request of an indication that an advertisement response is not to be provided and an inclusion in the second advertisement request that an advertisement response is to be provided, and because of the configuration of the front end 101 and the ads server system 103 to provide part-processing of the search query by the ads server 103 and to complete the processing using the results of the search performed by the search server system 102.

Further details and additional advantages will be apparent from the following description, which is to be read in accordance with the accompanying figures.

Figure 3:
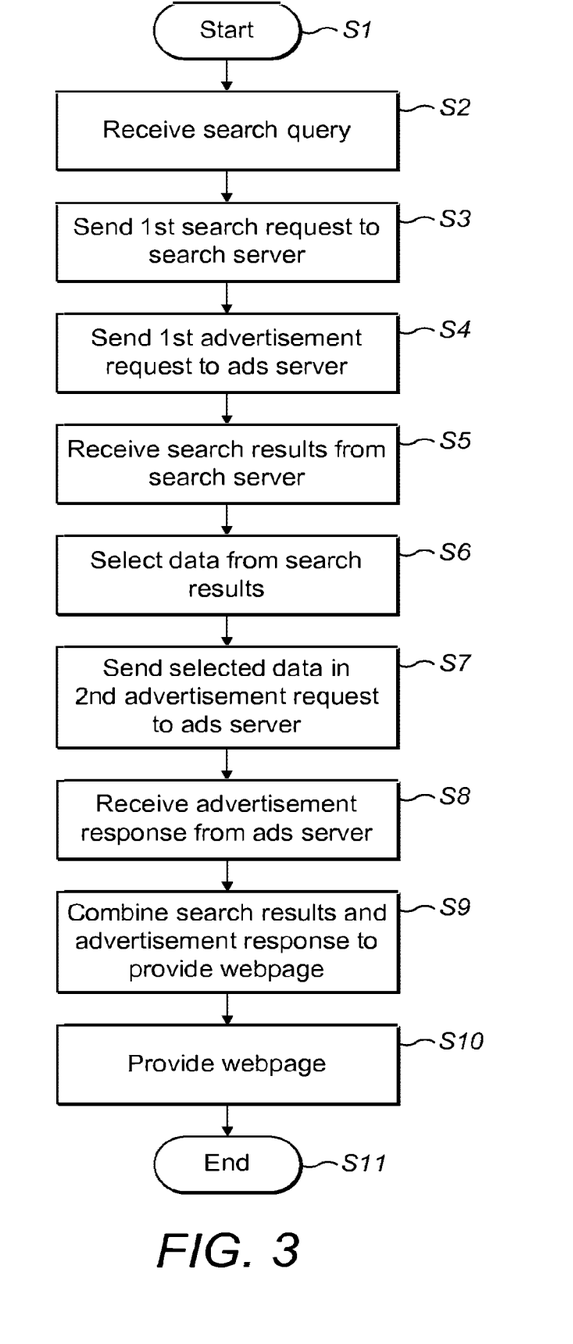
FIG. 3 is a flow chart illustrating operation of a front end of the system of FIG. 1 according to aspects of the invention.
Figure 4:
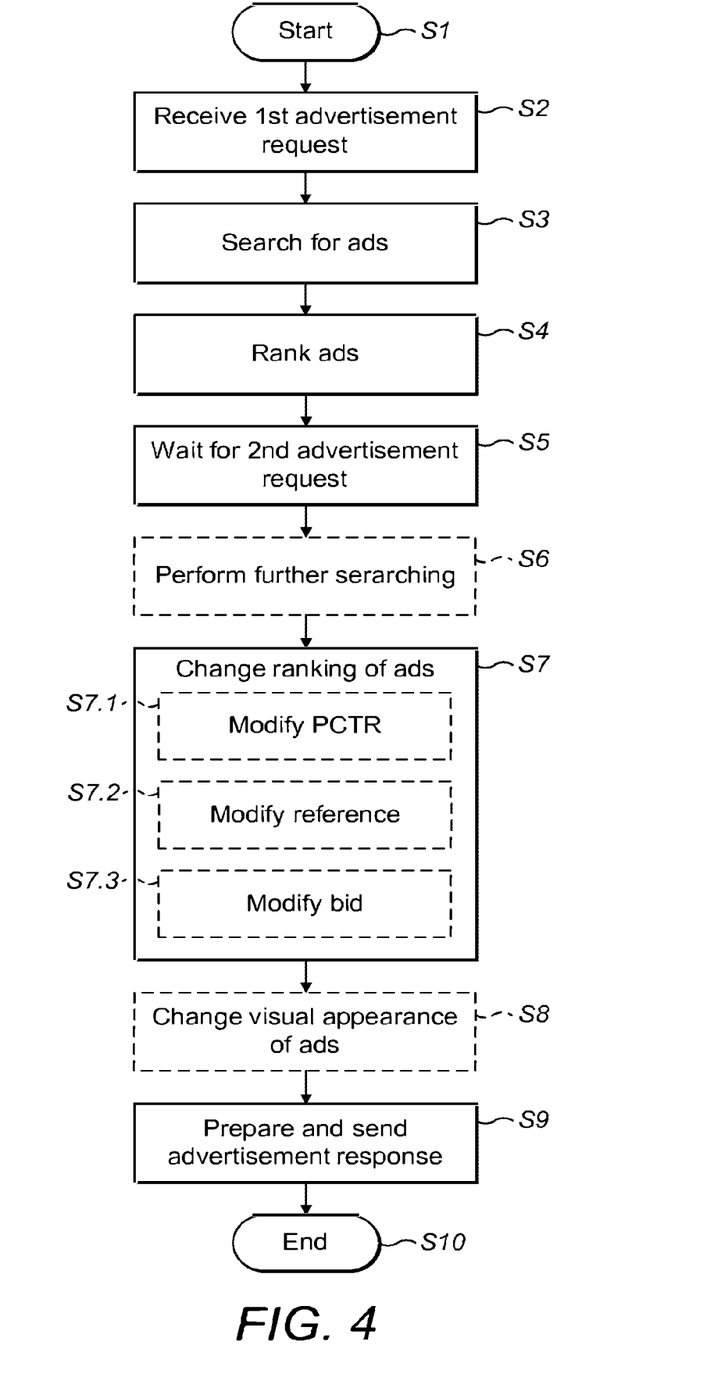
FIG. 4 is a flow chart illustrating operation of an ads server of the system of FIG. 1 according to aspects of the invention.

Detailed embodiments will now be described with reference to FIGS. 3, 4 and 5. FIG. 3 relates to steps performed by the front end 101 and FIG. 4 relates to steps performed by the ads server system 103.

Referring firstly to FIG. 3, the operation begins at step S1. At step S2, the search query is received from the user. This step was described above with reference to FIG. 2.

At step S3, the front end 101 sends a first search request to the search server system 102 in a message. The sending of the first search request is indicated at S1 in FIG. 1. The first search request may take any suitable form. For instance, it may include all of the text of the search query that was provided by the user and was received at step S2. Typically, the first search request does include all of the text of the search query received at step S2. The first search request may additionally include some context information. For instance, the context information may take the form of information relating to the user's current location, if this information is available. The context information may include information about content that is being displayed by a webpage in which the search query was entered by a user. For instance, if the search query was entered into a search text entry field provided in conjunction with content such as one or more maps or images or a third party website, the context information may include information identifying the related content.

At step S4, a first advertisement request is sent by the front end 101 to the ads server system 103 in a message. The sending of the first advertisement request is indicated at A2 in FIG. 1. The first advertisement request can take the same form as the first search request that was sent at step S3. Alternatively, the first advertisement request may take a different form. For instance, the first advertisement request may include a subset of the information that was included in the first search request that was sent to the search server.

The first advertisement request prepared by the front end 101 and sent at step S4 includes an indication that an advertisement response is not to be provided by the ads server 103. This may be provided in any suitable way. For instance, it may take the form of a flag, or more generally a predetermined value in a predetermined field. The indication may take the form of text, or it may simply be data.

After sending the first search request to the search server 102 at step S3, the search server system 102 processes the first search request. This may be entirely conventional, and does not need to be explained here. The result of processing of the first search request by the search server system 102 is search results, that are sent in a search response message to the front end 101. This is indicated at S2 in FIG. 1. The search response message including the search results are received from the search server system at the front end 101 at step S5 of FIG. 3.

The search results received at the front end 101 from the search server system 102 at step S5 include information falling into two categories, and possibly also information falling into a third category.

Information falling into the first category is information that is presented in the search response webpage to the user. This information includes a URL, a text snippet and one or more site links. The URL is text that indicates the location/node on the worldwideweb to which the first site link points. The site link is a hyperlink to the URL that is indicated. The displayed text of the hyperlink typically is different to the URL, and for instance typically is descriptive. The text snippet is plain text that is derived from the webpage to which the particular search result relates. The text snippet typically includes between 10 and 20 words and about 100 or so characters, although this is merely an example. The text snippet is text derived from the webpage to which the particular search result relates and which has been determined by the search server system 102 as being particularly relevant to the search query.

The second category of information is information that is not displayed to a user in the search page. This includes location information relating to the search result. The location information may for instance be an address, that is a street address or a PO box address, or latitude and longitude coordinates or such like. The information that is not displayed may additionally include entity information that is on the webpage to which the search result relates, for instance it may include categories that are relevant to the search result.

The optional other category of information is other elements such as a knowledge card, a map, a video, and other search queries.

The information described above is provided for each of plural search results. The number of search results that are included in the search results may be determined by the front end 101, for instance based on a preference setting of the user or based on some other information, or it may be determined by the search server system 102. A typical number of search results presented on a search response webpage is 10. The number of search results included in the search response typically is sufficient for a number of pages of search response webpage. For instance, 100 search results may be included in the search response.

The search response may also include a full page replacement, where the search server system 102 has determined that the search query may have included a spelling mistake. A full page replacement includes search results for a spell-corrected version of the search query, and indicates both the spell-corrected search query and the uncorrected search query. Search results for the uncorrected search query typically are not provided in a search response including a full page replacement.

At step S6, the front end 101 selects data from the search results received at step S5. The selection of data at step S6 involves selecting some of the data forming part of the search results received from the search server, and not selecting other data. This step may be performed in any suitable way.

For instance, if a knowledge card is present in search results, the knowledge card is not selected at step S6. Text snippets are selected at step S6, although in some embodiments they are not selected. Site links are not selected at step S6. Furthermore, full location information is not selected at step S6. URLs from the search results are selected.

At step S7, a second advertisement request is prepared using the data that was selected at step S6. The second advertisement request may includes some additional information. The second advertisement request may include information relating to the plural search results.

For instance, if a knowledge card is present in the search response, the knowledge card is not selected at step S6. However, the front end 101 provides the second advertisement request with a flag indicating that a knowledge card is present in the search response. The flag may be of a Boolean representation. Furthermore, full location information is not selected at step S6. However, a flag indicating whether or not location information is present may be provided. A flag is provided for each search result, allowing determination of which search results have location information associated therewith. Also, information identifying the type of content present at the webpage linked to by the URL of a search result is included in the second advertisement request. The type of content may be indicated as for instance a video, a webpage, a news story or an image. The type of content is provided separately for each search result.

Where the search response indicates that a map is to be provided in the search response webpage, the second advertisement request can include information identifying the map area, for instance by defining the rectangular border of the map. The second advertisement request can additionally include information identifying when search results are located within the map area.

The second advertisement request includes data selected from each of the search results that were provided by the search server system 102 to the front end 101 at step S5. For instance, where ten search results were provided, the second advertisement request includes information relating to each of the ten separate search results, which may be quite different from one another, as well as the user-specific data. Additionally, the search query to which the search results relate, this being the search query that was received by the front end 101 at step S2, is included in the second advertisement request.

The second advertisement request also includes an indication that an advertisement response is to be provided by the ads server system 103. This can be achieved in any suitable way. For instance, it may involve including a flag having an opposite value to the flag used in the first advertisement request that was sent at step S4.

Following preparation of the second advertisement request, it is sent to the ads server system 103 at step S7 by the front end 101. This is illustrated at A2 in FIG. 1.

Following step S7, the front end 101 waits for an advertisement response from the ads server system 103. The advertisement response is indicated at A3 in FIG. 1. When the advertisement response is received at step S8, the front end 101 continues with the operation of FIG. 3. In particular, at step S9 the front end 101 combines information from the search response received from the search server system 102 at step S5 with information from the advertisement response received from the ads server system 103 at step S8 into a search response webpage. The search response webpage is then provided at step S10 to the user, and is viewed by the user through their browser application.

The operation ends at step S11.

Operation of the ads server system 103 will now be described with reference to FIG. 4. Operation begins at step S1. At step S2, the ads server system 103 receives the first advertisement request. This is the first advertisement request that was sent by the front end 101 at step S4 of FIG. 3.

At step S3, the ads server system 103 searches for advertisements using the information included in the first advertisement request. This step may be performed in a conventional way. The result of step S3 is a number of advertisements that may be of interest to the user. For instance, the result of step S3 may be some dozens of advertisements, some hundreds of advertisements or even around a thousand advertisements.

At step S4, the advertisements are ranked. Ranking involves attributing a score to each of the advertisements and then ordering the advertisements according to their score. This may be performed conventionally.

For instance, attributing a score to an advertisement may involve applying a function of three parameters, which can be represented as follows:

$$\text{Score} = f(\text{bid}, \text{PCTR}, \text{relevance})$$

Here, the numerical value of the bid parameter is a value provided by an advertiser in advance, through their advertising account with the search service provider. The provision of a bid value for an advertisement is provided by the retrieve subsystem 105. The operation involves the ads server system 103 sending a request R1 for a bid for an advertisement to the retrieve subsystem 105. The retrieve subsystem 105 then calculates a bid value and sends it at R2 to the ads server system 103. The calculation of the bid value by the retrieve subsystem 105 may be performed in any suitable way, for instance conventionally.

PCTR is predicted click-through rate, and has a numerical value. A PCTR for a given advertisement is calculated by the PCTR subsystem 106. The PCTR may be calculated in any suitable way. The procedure is that the ads server system 103 sends P1 a request for a PCTR for an advertisement to the PCTR subsystem 106. The PCTR subsystem 106 then calculates a PCTR value for the advertisement, which can be performed in any suitable way. The PCTR value for the advertisement then is returned to the ads server system 103 by P2 in FIG. 1.

The numerical value of the relevance parameter is provided by the relevance score subsystem 107. This may be performed in any suitable way, for instance in a conventional manner. The procedure is that the ads server system 103 sends a relevance score RS1 request to the relevance score subsystem 107. The relevance score subsystem then calculates a relevance score for the advertisement and sends it at RS2 to the ads server system 103.

After a score has been calculated for each of the advertisements, using the function of the three parameters, the advertisements are ranked at step S4. Step S4 may involve physically organising the data relating to the advertisements such that higher ranked advertisements are physically located in memory together. Alternatively, the ranking of advertisements at step S4 may merely involve deleting or marking for deletion advertisements which have a score that is so low that the advertisement does not qualify to be included in the ranked advertisements.

At step S5, the ads server system 103 waits for a second advertisement request from the front end 101. The ads server system 103 knows to wait for the second advertisement request by virtue of the inclusion in the first advertisement request of the indication that an advertisement response is not to be provided.

Once a second advertisement request is received from the front end 101, the operation continues to step S6. Step S6 is an optional step of performing further searching for advertisements. Step S6 is not a repeat of step S3; instead it is a significantly more focused and shorter duration search. The further searching performed in step S6 may for instance be based on a small number of the highest search results included in the second advertisement request. For instance, the further searching performed at step S6 may be based on the top (first) one of the search results included in the second advertisement request.

For instance, a search query of "highest mountain in the world" may produce from the search server system 102 a number of search results including a top (first) result relating to an online encyclopedia entry for Mount Everest. The search query is included in the first advertisement request received at step S2 and the search result of "Mount Everest" is received in the second advertisement request at step S5. In this case, step S6 may involve performing further searching in respect of "Mount Everest", resulting in one or more advertisements for organised tours or vacations to Mount Everest.

Advertisements found during the further search in step S6 are scored using the formula given above and are included in the ranked advertisements from step S4.

At step S7, the scores of advertisements, and thus potentially their ranking, is changed by the ads server system 103. As shown in FIG. 4, there are three aspects to this step. The first is modifying the PCTR at step S7.1. The second is modifying the relevance score at step S7.2. The third is modifying the bid at step S7.3. Changing the score/ranking of ads at step S7 may involve just one of the options of steps S7.1 to S7.3. Alternatively, it may involve two of the options of steps S7.1 to S7.3. For instance, it may involve modifying the PCTR and modifying the relevance score. Alternatively, step S7 may involve all three of the options of step S7.1 to S7.3.

Step S7 is performed separately for each advertisement.

The ads server system 103 may modify the value of PCTR for an advertisement at step S7.1 in one of a number of different ways. For instance, the PCTR of an advertisement is changed depending on the user interface elements that are indicated in the second advertisement request. For a given advertisement, the PCTR may be modified by the ads server system 103 depending on whether a map is indicated as being a user interface element that is present in the search results. As indicated above, the second advertisement request does not include any maps, but can include an indication of whether a map is to be provided. The PCTR may be modified upwards or downwards, that is it may be increased or decreased, depending on whether a map is to be provided with the search results. The particular algorithm for modifying the PCTR depending on whether or not a map is to be provided can take any suitable form.

Similarly, the PCTR for an advertisement can be changed depending on whether the search response includes a knowledge card. As indicated above, the presence or absence of a knowledge card in the search response is indicated in the second advertisement request.

Additionally, the PCTR for an advertisement may be modified by the ads server system 103 depending on the number of images that are present in the search results, as indicated in the second advertisement request.

In the case of modifying the PCTR depending on whether there is a knowledge card in the search results and how many images are present in the search results may result in the PCTR being increased or decreased, depending on the choice of algorithm.

Modifying the relevance score of an advertisement at step S7.2 can take any suitable form. For instance, for a search query relating to "car insurance", the top search result may be an insurance provider such as "Example Car Insurance". In this case, step S7.2 may modify the relevance score of advertisements that relate to "Example Car Insurance", in particular by giving them a higher relevance score. Step S7.2 may or may not involve reducing the relevant score of advertisements that do not lead to "Example Car Insurance".

Modifying the relevance at step S7.2 may involve increasing the relevance score for advertisements that relate to a physical location that is relatively proximate to a location of the top search result. For instance, a top search result relating to a particular theatre in London may result in step S7.2 increasing the relevance score for advertisements relating to restaurants that are located geographically close to the physical location of the theatre.

If the second advertisement request includes snippets for the search results, modifying the relevant score at step S7.2 may involve increasing the relevance score for advertisements that include a relatively large amount of text in common with the snippets of the top one or more search results.

Modifying the bid for an advertisement at step S7.3 can be performed in one of a number of ways. For instance, advertisers may specify with the search services provider that their bids for their advertisements are modified depending on search results that are to be provided to the user in the search response webpage. For instance, an advertiser may specify that their bid for an advertisement is to be increased from value x to value y if the search results resulting from a search query include a particular advertiser, which may for instance be the bidding advertiser or may be a third party advertiser, for instance a competitor of the bidding advertiser. For instance, an advertisement for a flower delivery service may be specified by the advertiser to have a bid x associated therewith and for the bid to be modified to a value y if the search results for a search query include flower delivery services of a particular competitor to the bidding advertiser.

It will be appreciated that modifying the PCTR at step S7.1, modifying relevance at step S7.2, and modifying bid at step S7.3 is performed for at least some of the advertisements that were ranked in step S4. As such, the score for at least some of the advertisements is changed by performance at step S7. Consequently, the ranking of the advertisements will be changed as a result of performance at step S7 in most, if not all, instances.

It will be appreciated also that modifying the PCTR at step S7.1, modifying relevance at step S7.2, and modifying bid at step S7.3 is performed using information related to only some of the search results included in the search response. For instance, modifying the PCTR at step S7.1, modifying relevance at step S7.2, and modifying bid at step S7.3 is performed using information related to only three or five of the search results included in the search response.

As is conventional, one or more highest rank advertisements are provided in the search response webpage to the user by the front end 101. As such, modifying the score of advertisements in step S7 can result in different advertisements being provided to the user. Advantageously, these advertisements have been selected taking into account not only the search query but also the search results, as provided by the search server system 102, that are to be provided alongside the advertisements in the webpage to the user. Thus, more information is taken into account in the provision of advertisements than is possible on prior art systems. Moreover, this is achieved with a relatively small additional delay since the searching for advertisements and much of the processing of the advertisements by the ads server system 103 is performed whilst the search server system 102 is searching for the relevant search results. There is some additional delay in the provision of the search response webpage to the user but the additional delay is relatively small, resulting only from step S7 and optionally steps S6 and S8, and is considered to be an acceptable additional delay considering the benefits.

Following step S7, there is an optional step of changing the visual appearance of advertisements at step S8. The changing of the visual appearance of the advertisements takes into account the content of the second advertisement request received at step S5. For instance, if search results have site links, step S8 may involve displaying more site links for a given advertisement. Alternatively or additionally, if a number of top search results prominently feature location information, step S8 may involve changing the visual appearance of the advertisements that are to be provided in the search response webpage such that locations within the advertisements are shown more prominently. Step S8 may alternatively involve making a determination to show extensions of advertisements whereas otherwise they would not have been shown. These extensions can include map extensions or video extensions etc. Map extensions of advertisements can be determined to be shown at step S8 where for instance the top search results include a relatively high amount of location information. A decision to show video extensions may be made at step S8 where the top search results include a relatively high amount of video content. Alternatively, step S8 may involve determining to show extensions such as map extensions and video extensions more prominently than otherwise they would have been shown in the search results provided to the user.

At step S9, the ads server system 103 prepares and sends an advertisement response to the front end 101. The advertisement response includes a number of advertisements. The number of advertisements is selected by the ads server system 103 depending on a number of factors, and this may be performed in a conventional manner. The content of the advertisement included in the advertisement response sent at step S9 may be conventional. The content of the advertisements may include text, URLs and site links. The content of the advertisements may also include other content such as video, map content etc. The advertisement response may also include information that allows the front end 101 to determine how to show the corresponding advertisements. In particular, the advertisement response may include information identifying what site links are to be displayed, what locations are to be displayed and in what format, and whether extensions are to be displayed and if so how they are to be displayed. The advertisement response may be the same as in conventional systems. However, there is a difference in that the selection of advertisements included in the advertisement response takes account of the search results provided by the search server system 102, in particular by changing the score and thus ranking of advertisements through implementation of step S7 of FIG. 4.

The operation ends at step S10.

As mentioned above, the ads server system 103 includes multiple servers 103a to 103d. There may be many tens or even hundreds of servers 103a to 103d within the ads server system 103. This poses a number of challenges with the two stage advertisement searching and ranking procedure that was described above with reference to FIG. 4. These challenges have been overcome using a new technique which will now be described with reference primarily to FIG. 5.

Briefly, the load balancer 104 responds to receiving the first advertisement request A1 from the front end 101 by choosing one of the ads servers 103a to 103d. The load balancer 104a opens a communication session with the selected ads server 103a to 103d, to provide a connection between the load balancer 104a and the selected ads server 103a to 103d. The load balancer 104 also maintains a separate communication session between the front end 101 and the load balancer 104, to provide a separate connection between the front end 101 and the load balancer 104. Subsequently, the load balancer 104 manages communication between the front end 101 and the selected ads server 103a to 103d through these two separate connections.

Figure 5:
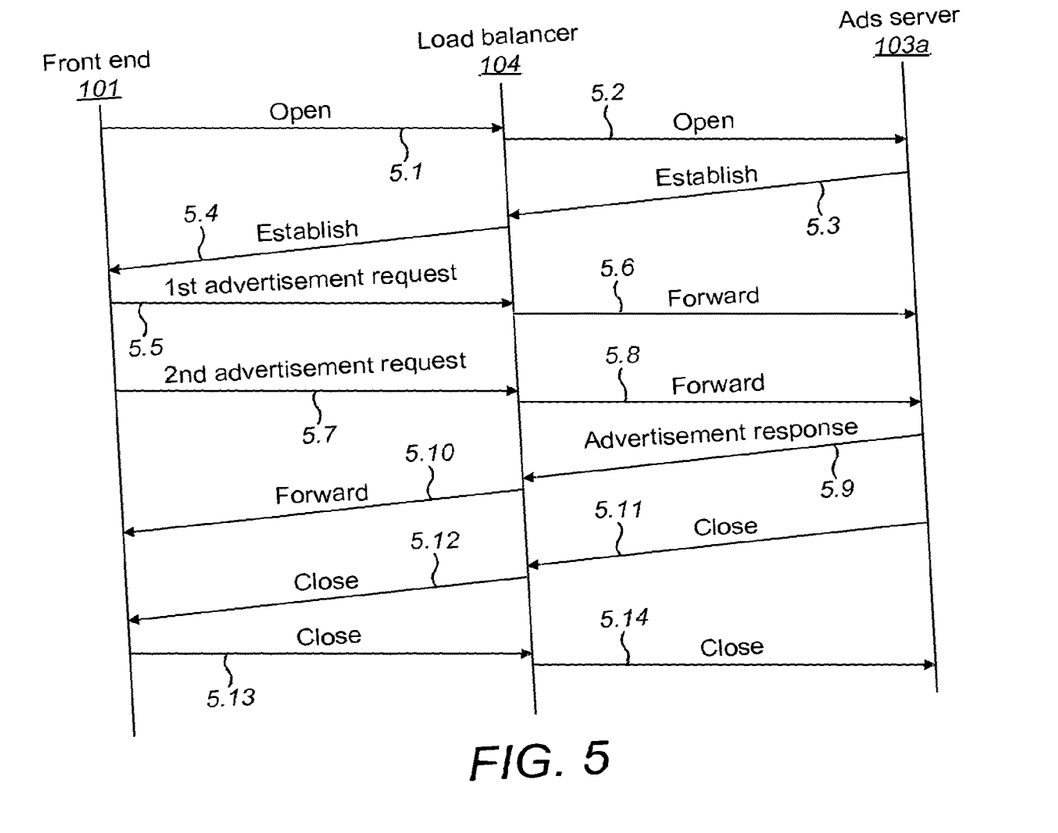
FIG. 5 is a messaging diagram illustrating the flow of messages between some components of the FIG. 1 system according to aspects of the invention.

In detail, FIG. 5 shows the front end 101, the load balancer 104 and a particular ads server, in this case the first ads server 103a. FIG. 5 also shows messages that pass between the various components. It will be seen that the front end 101 does not communicate directly with the ads server 103a. Instead the front end 101 communicates with the load balancer 104, and the load balancer 104 communicates with the ads server 103a.

The first message is an open message 5.1 that is sent from the front end 101 to the load balancer 104. This constitutes a request to open a connection or commence a communication session between the front end 101 and the load balancer 104. The front end 101 sends the open message 5.1 in response to receiving a search query from the user, but before sending the first advertisement request.

In response to receiving the first open message 5.1 from the front end 104, the load balancer 104 selects an ads server, in this case the first ads server 103a, for handling the search and ranking of advertisements. The load balancer 104, after it has selected the ads server 103a, sends an open message 5.2 to the selected ads server 103a. In response to receiving the open message 5.2, the ads server 103a prepares and sends an establish message 5.3 to the load balancer 104. Upon receipt of the establish message 5.3 at the load balancer 104, a connection is established between the load balancer 104 and the ads server 103a. In response to receiving the establish message 5.3, the load balancer 104 sends an establish message 5.4 to the front end 101. After the establish message 5.4 has been received at the front end 101, a connection is established between the front end 101 and the load balancer 104.

For each connection, a session is in place between the two relevant components. The session is identified by a session identifier, that is agreed by the parties involved in the session. The session identifier is included in headers of packets that are sent between the parties to the connection, so that the recipient party can ascertain that the packets are part of the relevant connection. This may be performed in any suitable way, and connection sessions are well known in the art. Using session identifiers in this way allows the presence of multiple simultaneous sessions between the parties, allowing the processing of many search queries in parallel.

After the session has been established between the front end 101 and the load balancer 104, the front end 101 sends the first advertisement request message 5.5 to the load balancer 104. This is the first advertisement request message that was sent at step S4 of FIG. 3 and received at step S2 of FIG. 4. From the session identifier included in headers of the message 5.5, the load balancer 104 is able to determine the particular ads server 103a to which to forward the first advertisement request. The first advertisement request is forwarded as a forward message 5.6 from the load balancer 104 to the ads server 103a. Here, the payload of the message is the same as that of the first advertisement request, but the headers of the message are different because of the different connection.

The first advertisement request message 5.5 and the forwarded message 5.6 include an indication that an advertisement response is not required. As such, the ads server 103a does not provide a response. Instead, the ads server 103a performs steps S1 to S5 of FIG. 4, and waits for the second advertisement request.

The front end 101 sends the second advertisement request message 5.7 to the load balancer 104. The load balancer 104 in response forwards a message 5.8 including the payload of the second advertisement request message to the ads server 103a. As discussed above, the second advertisement request message 5.7 and the forwarding message 5.8 include an indication that an advertisement response is required. This is the trigger for the first ad server 103a to progress from step S5 onto step S7. Upon receipt of the forwarding message 5.8, the ads server 103a performs step S7 of FIG. 4, and optionally performs steps S6 and S8 as appropriate.

The advertisement response is then prepared in the ads server 103a and is sent as an advertisement response message 5.9 to the load balancer 104. The load balancer 104 upon receiving the advertisement response message 5.9 forwards 5.10 the advertisement response message to the front end 101. The payload of the forwarded message 5.10 is the same as the payload of the advertisement response message 5.9 but the headers are different.

After sending the advertisement response message 5.9, the ads server 103a knows that the connection with the load balancer 104 for this particular session is no longer required. Consequently, it sends a close message 5.11 to the load balancer 104a. In response to receiving the close message 5.11, the load balancer 104 sends a close message 5.12 to the front end 101. This requests closing of the connection between the load balancer 104 and the front end 101. In response to receiving the close message 5.12, the front end 101 sends a close message 5.13 to the load balancer 104. Once the close message 5.13 is received at the load balancer, the connection between the front end 101 and the load balancer 104 is closed, or put another way the session is terminated.

The load balancer 104 closes the session with the first ad server 103a by sending a close message 5.14 to the first ad server 103a. Upon receiving the close message 5.14 at the first ad server 103a, the session between the load balancer 104 and the first ad server 103a is closed. The close message 5.14 may be sent from the load balancer 104 to the first ad server 103a in response to receiving the closed message 5.13 from the front end 101. Alternatively, it may be sent in response to receiving the close message 5.11 from the first ad server 103a.

Each of the front end 101, the load balancer 104 and the first ad server 103a are configured to implement timeouts. When a message is not received with a predetermined period, set by a timeout value, it is determined that a problem has occurred and the connection is closed/the session is terminated. The termination of the session between the load balancer 104 and the first ad server 103a necessarily results in the load balancer 104 failing to provide one of the expected messages to the front end 101. As such, the front end 101 also experiences a timeout and closes the connection session between the front end 101 and the load balancer 104. The corresponding situation applies where the load balancer 104 does not receive a message from the front end 101 within a timeout period, resulting in termination also of the connection between the load balancer 104 and the ads server 103a.

Similarly, the front end 101 is responsive to determining that a message has not been received from the load balancer 104 within a predetermined timeout period to close the connection between the front end 101 and the load balancer 104. A consequence of this is that the session between the load balancer 104 and the first ad server 103a is also terminated. The ads server 103a is configured in a corresponding manner to behave in a corresponding way.

Using the scheme of FIG. 5, the front end 101 does not need to be aware of the identity of the first ad server 103a nor does it need to know its network address. Instead, the load balancer 104 conducts all needed communication with the first ad server 103a. All that the front end 101 needs to know is the session identifier relating to the communication session between the front end 101 and the load balancer 104. Similarly, the first ad server 103a does not need to know the identity of the front end 101, nor does it need to know its network address. All that the ads server 103a needs to know is the session identifier relating to the communication session between the ads server 103*a* and the load balancer 104.

Figure 6:
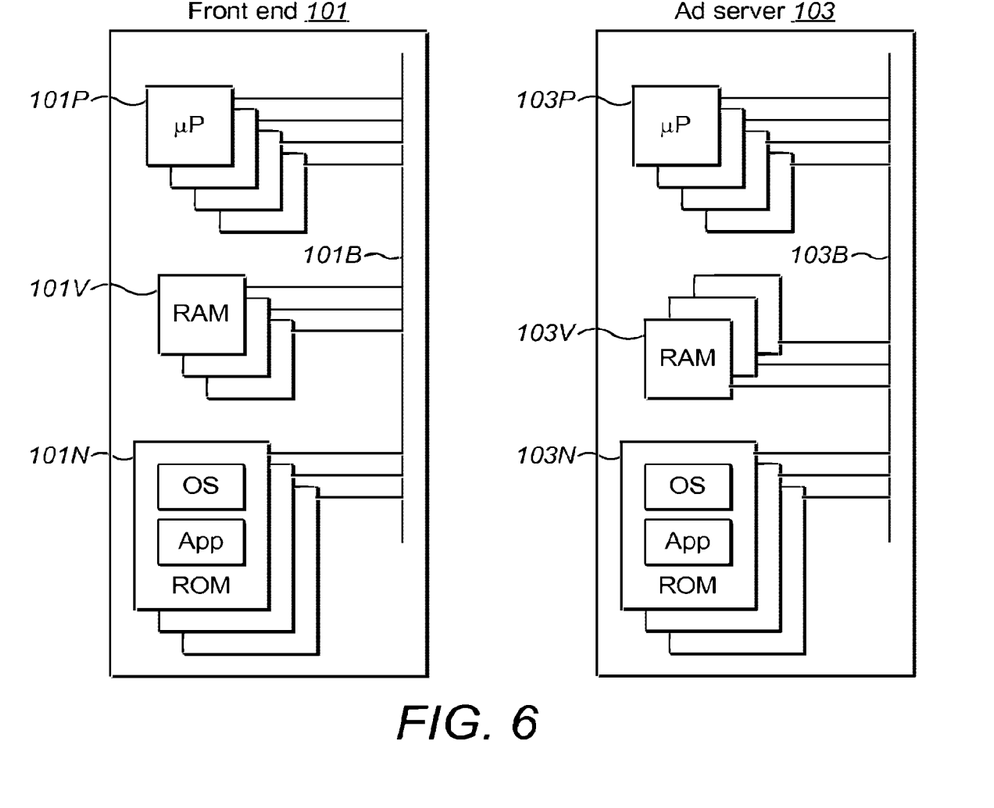
FIG. 6 is a schematic diagram illustrating components within some components of the FIG. 1 system.

FIG. 6 illustrates schematically some internal components of the front end 101 and the ads server 103*a*. The other ads servers 103*b* to 103*d* are substantially the same as the first ads server 103*a*.

The front end 101 includes at least one processor 101P, at least one volatile memory 101V and at least one non-volatile memory 101N. Each is connected to a bus 101B.

Within the non-volatile memory 101N are stored an operating system OS and one or more software applications App. The non-volatile memory may be read only memory (ROM), such as for instance a hard disk drive, or flash memory, optical storage, tape storage etc. Other non-volatile memories may be included, and are illustrated schematically in the figure.

The volatile memory 101V may be for instance random access memory (RAM), flash memory etc. Multiple volatile memories may be included, and are illustrated in FIG. 6.

The processor 101P may for instance be a general purpose processor. It may be a single core device or a multiple core device. The processor 101P may be a central processing unit (CPU) or a general processing unit (GPU). Alternatively, it may be a more specialist unit, for instance a RISC processor or programmable hardware with embedded firmware. Multiple processors 101P may be included in the front end 101, and are illustrated as such in FIG. 6. The processor 101P may be termed processing means.

Generally speaking, the processor 101P executes one or more applications App using the operating system OS, both of which are stored permanently or semi-permanently in the non-volatile memory 101N, using the volatile memory 101V temporarily to store software forming a whole or part of the operating system OS and the applications App and also temporarily to store data generated during execution of the software.

The first ads server 103*a* is similarly constructed. In particular, the first ads server 103*a* includes at least one processor 101P, at least one volatile memory 101V and at least one non-volatile memory 101N. Each is connected to a bus 101B.

Within the non-volatile memory 103N are stored an operating system OS and one or more software applications App. The non-volatile memory may be read only memory (ROM), such as for instance a hard disk drive, or flash memory, optical storage, tape storage etc. Other non-volatile memories may be included, and are illustrated schematically in the figure. The volatile memory 103V may be for instance random access memory (RAM), flash memory etc. Multiple volatile memories may be included, and are illustrated in FIG. 6.

The processor 103P may for instance be a general purpose processor. It may be a single core device or a multiple core device. The processor 103P may be a central processing unit (CPU) or a general processing unit (GPU). Alternatively, it may be a more specialist unit, for instance a RISC processor or programmable hardware with embedded firmware. Multiple processors 103P may be included in the first ads server 103*a*, and are illustrated as such in FIG. 6. The processor 103P may be termed processing means.

Generally speaking, the processor 103P executes one or more applications App using the operating system OS, both of which are stored permanently or semi-permanently in the non-volatile memory 103N, using the volatile memory 103V temporarily to store software forming a whole or part of the operating system OS and the applications App and also temporarily to store data generated during execution of the software.

It will be appreciated that the above-described embodiments are not limiting on the scope of the invention, which is defined by the appended claims and their alternatives. Various alternative implementations will be envisaged by the skilled person, and all such alternatives are intended to be within the scope of the claims.

For instance, although in the above it is the second advertisement request that includes an indication that a response is required, the invention is not limited to this. In other implementations, it is a third or subsequent request that includes the indication that a response is required. The second request may include further information that can be used in the search and/or ranking of candidate advertisements, in which case the modifying of the score of advertisements may be a two-stage process.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer.

A computer-readable medium may comprise a computer-readable storage medium that may be any tangible media or means that can contain or store the instructions for use by or in connection with an instruction execution system, apparatus, or device, such as a computer as defined previously.

According to various embodiments of the previous aspect of the present invention, the computer program according to any of the above aspects, may be implemented in a computer program product comprising a tangible computer-readable medium bearing computer program code embodied therein which can be used with the processor for the implementation of the functions described above.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits, and other devices. References to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

The invention claimed is:

1. A system comprising:
a front end configured to perform operations comprising:
   receiving a search query;
   sending the search query to a first server;
   sending, to a second server, a first request including the search query and an indication that a response to the first request is not required to be provided; and
   receiving search results from the first server; and
the second server, wherein the second server is configured to perform operations comprising:
   identifying, in response to receiving the first request, a first set of advertisements related to the search query;
   waiting for a second request rather than responding to the first request based on the indication that the response to the first request is not required to be provided being included in the first request;
   receiving a second request that includes at least some of the search results;
   modifying the first set of advertisements based on the at least some of the search results included in the second request; and
   sending, in response to the second request, a response that includes at least one advertisement from among the modified first set of advertisements, wherein the at least one advertisement is combined into a search results page with the search results.

2. The system of claim 1, wherein the second server is configured to perform operations comprising performing an additional search for advertisements beyond those included in the first set of advertisements using information included in the second request.

3. The system of claim 1, wherein the second server is configured to perform operations comprising:
   modifying a score of at least one advertisement in the first set of advertisements based on a predicted click-through rate of the at least one advertisement; and
   selecting that at least one advertisement from among the modified first set of advertisements based at least in part on the modified score.

4. The system of claim 3, wherein the second server is configured to perform operations comprising modifying the predicted click-through rate based on user interface elements identified in the second request.

5. The system of claim 4, wherein the second server is configured to perform operations comprising modifying the score of at least one advertisement by modifying a relevance score of the at least advertisement based on content of a top one of multiple search results identified in the second request.

6. The system of claim 5, wherein the second server is configured to perform operations comprising modifying the relevance score of the at least one advertisement based on a location of the top one of the multiple search results identified in the second request.

7. The system of claim 1, wherein the front end is configured to perform operations comprising:
   processing the search results received from the first server; and
   for at least some of the search results, including some, but less than all, information from the search results in the second request.

8. A method comprising:
receiving, by a front end, a search query;
sending, by the front end, the search query to a first server;
sending, by the front end and to a second server, a first request including the search query and an indication that a response to the first request is not required to be provided;
receiving, by the front end, search results from the first server;
identifying, by the second server and in response to receiving the first request, a first set of advertisements related to the search query;
waiting, by the second server, for a second request rather than responding to the first request based on the indication that the response to the first request is not required to be provided being included in the first request;
receiving, by the second server, a second request that includes at least some of the search results;
modifying, by the second server, the first set of advertisements based on the at least some of the search results included in the second request; and
sending, by the second server in response to the second request, a response that includes at least one advertisement from among the modified first set of advertisements, wherein the at least one advertisement is combined into a search results page with the search results.

9. The method of claim 8, comprising performing, by the second server, an additional search for advertisements beyond those included in the first set of advertisements using information included in the second request.

10. The method of claim 8, comprising:
modifying, by the second server, a score of at least one advertisement in the first set of advertisements based on a predicted click-through rate of the at least one advertisement; and
selecting, by the second server, that at least one advertisement from among the modified first set of advertisements based at least in part on the modified score.

11. The method of claim 10, comprising modifying, by the second server, the predicted click-through rate based on user interface elements identified in the second request.

12. The method of claim 11, comprising modifying, by the second server, the score of at least one advertisement by modifying a relevance score of the at least advertisement based on content of a top one of multiple search results identified in the second request.

13. The method of claim 12, comprising modifying, by the second server, the relevance score of the at least one advertisement based on a location of the top one of the multiple search results identified in the second request.

14. The method of claim 8, comprising:
processing, by the front end, the search results received from the first server; and
for at least some of the search results, including, by the front end, some, but less than all, information from the search results in the second request.

15. Two or more non-transitory computer readable media storing instructions that, upon execution, cause performance of operations comprising:
receiving, by a front end, a search query;
sending, by the front end, the search query to a first server;
sending, by the front end and to a second server, a first request including the search query and an indication that a response to the first request is not required to be provided;
receiving, by the front end, search results from the first server;

identifying, by the second server and in response to receiving the first request, a first set of advertisements related to the search query;

waiting, by the second server, for a second request rather than responding to the first request based on the indication that the response to the first request is not required to be provided being included in the first request;

receiving, by the second server, a second request that includes at least some of the search results;

modifying, by the second server, the first set of advertisements based on the at least some of the search results included in the second request; and sending, by the second server in response to the second request, a response that includes at least one advertisement from among the modified first set of advertisements, wherein the at least one advertisement is combined into a search results page with the search results.

16. The two or more non-transitory computer readable media of claim 15, wherein the operations comprise performing, by the second server, an additional search for advertisements beyond those included in the first set of advertisements using information included in the second request.

17. The two or more non-transitory computer readable media of claim 15, wherein the operations comprise:

modifying, by the second server, a score of at least one advertisement in the first set of advertisements based on a predicted click-through rate of the at least one advertisement; and selecting, by the second server, that at least one advertisement from among the modified first set of advertisements based at least in part on the modified score.

18. The two or more non-transitory computer readable media of claim 17, wherein the operations comprise modifying, by the second server, the predicted click-through rate based on user interface elements identified in the second request.

19. The two or more non-transitory computer readable media of claim 18, wherein the operations comprise modifying, by the second server, the score of at least one advertisement by modifying a relevance score of the at least advertisement based on content of a top one of multiple search results identified in the second request.

20. The two or more non-transitory computer readable media of claim 19, wherein the operations comprise modifying, by the second server, the relevance score of the at least one advertisement based on a location of the top one of the multiple search results identified in the second request.

* * * * *